Feb. 13, 1951     G. TERNULLO     2,541,559
SCRAPING UTENSIL HAVING AN OVAL BOWL
Filed Sept. 25, 1947
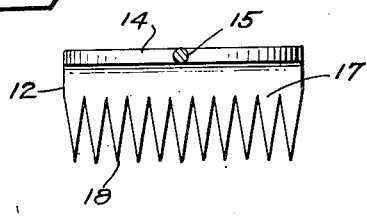
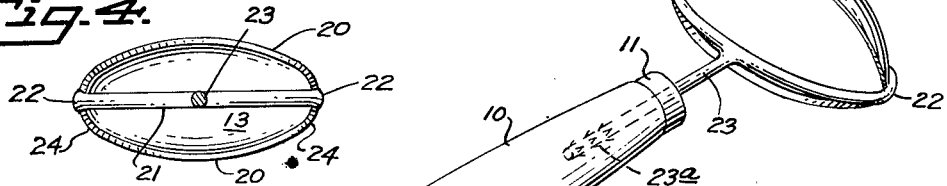
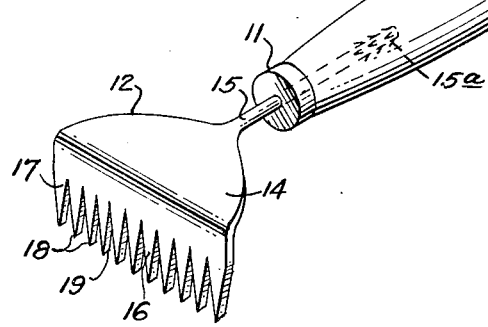
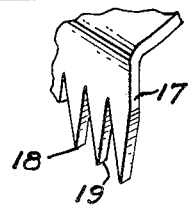
INVENTOR.
GAETANA TERNULLO
BY
ATTORNEY Patented Feb. 13, 1951

2,541,559

UNITED STATES PATENT OFFICE 2,541,559

SCRAPING UTENSIL HAVING AN OVAL BOWL

Gaetana Ternullo, San Francisco, Calif.

Application September 25, 1947, Serial No. 776,077

3 Claims. (Cl. 146—203)

This invention relates to scraping utensils and more particularly relates to such utensils which may be employed for shredding the surface of meat, vegetables and the like and collecting the pulp so shredded.

Many persons due to digestive disarrangements find it inconvenient and gastrically distressing to eat meat in its normal form because of its tough sinewy body, or to readily digest the more fibrous and husk enclosed vegetables, such as corn on the cob, pumpkin, cucumbers and the like. Likewise, very young children require their meat and vegetables in macerated form.

It is therefore among the objects of this invention to provide a scraper utensil adaptable for scarifying meat and vegetables and for scraping the tender portions of meat or vegetables from the tough sinews or fibers thereof.

Another object is to provide a scarifying and scraping utensil for manual manipulation by horizontal stroking movement while pressure may be exerted vertically downward.

A further object is to provide a scraper utensil for both scarifying and collecting the scarified pulp, and, if desired, by alternate opposite stroke manipulation.

A still further object is to provide a scarifying device and a pulp collector adapted for manual operation for either of said purposes in a substantially horizontal plane so that pressure may be approximately vertically downward during operation.

With the foregoing and other objects in view, all of which will more fully appear as this description proceeds, one form in which the invention may be embodied is described herein and illustrated in the accompanying drawing, it being understood that minor changes of details may be made by substitution of equivalents, without departing from the spirit of the invention which is defined in the appended claims.

In the accompanying drawing which is made a part hereof:

Fig. 1 is a perspective view of the invention;

Fig. 2 is a longitudinal side elevation, partly in section;

Fig. 3 is a lateral transverse section on line 3—3 of Fig. 2;

Fig. 4 is a lateral transverse section on line 4—4 of Fig. 2; and

Fig. 5 is an enlarged fragmentary perspective view of a portion of Fig. 1.

Referring to the drawing in which like reference characters indicate corresponding parts in the several views, 10 indicates an elongated handle member of any suitable material such as wood, plastic, stainless steel and the like. The handle is preferably circular in lateral transverse section, and each of its opposite ends may be bound by a suitable ferrule cap 11.

At one end of the handle there is mounted a scarifier 12 and at the opposite end of the handle is mounted a concave elongated oval scraper and collecting bowl 13.

The scarifier comprises a plane plate portion 14, tapering at one end into an integral extended shank 15, the terminal end portion of which is tightly engaged by embedding in the body of one end of the handle, preferably axially centrally thereof. The integral free end portion of the plate is bent at an angle to the plane of the plate, preferably substantially perpendicularly, said free end terminating in a row of a plurality of elongated teeth or tines 16, relatively broad at the connected base 17, and tapered to a sharp apex 18, the thickness of the material of which the scarifier is made thus providing at the terminal end of each tooth a sharp cutting blade 19 of substantial length parallel to the axis of the handle and plate 14. The perpendicular bending of the plate and the provision of elongated teeth therein, spaces the cutting edges 19 of the teeth a substantial distance from the alignment of the axis of the handle, whereby the elongated oval collecting bowl will be free of interference with the cutting stroke of the teeth in manipulation by the handle.

The concave scraper and collecting bowl 13 at the opposite end of the handle is elongated and elliptical at its opening, the major axis or longer dimension of the elliptical opening being substantially parallel to the row of teeth of the scarifier 12 and is transversely perpendicular in the plane of the axis of the handle 10, and the perimeter edge portion of the bowl is sharpened at an incline as at 20 to provide a sharp elliptical elongated perimeter edge for scraping, said edge, by reason of the elongated oval shape of the bowl, providing a maximum length for an arcuate scraping edge, consistent with maintaining a bowl shape. The bowl is closed at its opposite ends by the concavity of its wall and is preferably relatively shallow in depth, that is, in a transverse vertical cross section in a plane centrally intersecting the minor axis or shorter dimension of the oval opening, as shown in Fig. 2, bowl is half an oval. The shape or contour of the bowl on the opposite sides of said central plane are substantially similar relative to each of such halves of the bowl, as distinguished from a conventional spoon bowl which has one end portion contoured broad and deep while the other end tapers relatively shallow and narrow. The concavity and the opening of the bowl faces the handle and the scarifier blade.

The bowl is secured to the handle by a bifurcated yoke 21 and a connected shank 23. The arms of the yoke are arcuate so that the central portion of the yoke is substantially spaced from the plane of the opening of the bowl. The respective ends of the two arms of the yoke are fixedly connected to the opposite ends of the bowl on the major axis of the opening of the bowl as at 22.

Centrally of the yoke, and preferably integral therewith is an extended shank 23, the opposite end portion of which is tightly embedded in the said opposite end of the handle and preferably coaxial therewith, the arms of the yoke 21 and the shank 23 thus spacing one of the elongated halves of the bowl on each side of the axis of the handle, whereby one scraping edge 20 of the bowl is above the plane of the scarifier plate 14 and the handle axis, and may be used as a scraper independently, whereas the opposite scraping edge 20 of the bowl is on the same side of the handle axis as are the elongated scarifier teeth 16, though the elongation of the teeth extend the cutting edges 19 of the teeth further from said axis than the scraping edge of the last-mentioned side of the bowl.

The shanks 15 and 23 may be burred as at 15a and 23a to more securely hold them in the handle.

In operation the handle is gripped in hand of the operator, in which position the normal and natural movement of the utensils is reciprocation substantially axially for scarifying the meat or other material and the manual pressure is naturally downward, the sharpened apices of the teeth with their elongated blade ends 19 serving to cut the surface of the product into slivers rather than tear it into shreds as sharp points having no length would do. Sharp points having no substantial cutting blade width also penetrate so deeply into the product as to resist smooth consistent and uniform shredding and are liable to tear out chunks of the product, as well as to snag upon rather than cut through any sinews or fibers encountered.

Having sufficiently scarified the product with the scarifier, the handle member may be reversed in the hand of the operator and due to the relative parallelism of the major axis of the bowl and the scarifier teeth, the utensil may be held in the same natural position as theretofore, stroking the product by similar axial reciprocation of the handle and exerting a natural downward pressure. Thus the sharpened edges of the bowl remove as a macerated pulp the superficial coat only of the meat or other product which has been incised, the elliptical shape of the perimeter of the opening of the bowl providing a relatively long bearing surface which opposes cutting by the sharpened edge too deeply into the body of the product, in which result or action the incline of the sharpened edge also serves to prevent penetration of the edge too deeply into the product, in the manner of an inclined blade of a wood plane removing a surface shaving of uniform thickness without deep penetration into a board. The greater degree of arc of the elliptical perimeter of the bowl at the parts more nearly adjacent to the ends of the major axis, as indicated 24 enables the edge of the bowl at that portion to be operated in corners and small spaces, as around the bones in steaks and chops.

The shallow depth of the bowl provided by its semi-oval lateral transverse section as shown in Fig. 2 and spacing of the yoke from the bowl as above described, facilitates the easy removal from the bowl of collected macerated or pulped product and likewise renders the bowl easy to wash and dry.

Since the cutting end of the teeth of the scarifier, and one scraping edge of the collecting bowl are both overlying in a similar vertical plane, though having the respective scarifying and scraping edges 19, 20 offset by the scarifier teeth being the longer, the utensil may also, if desired, be operated without reversing its ends in the hand of the operator, by scarifying the product by movement of the utensil in one direction, tilting the angle of the handle axis and thereby collecting the scarified material on the reverse stroke of the operation. Since the scarifying teeth are the longer or farther removed from the handle axis, the offset scraping edge of the bowl is not apt to strike against the product during the scarifying stroke with the utensil. And since in operating of the tool in the hand there is a swinging movement at the wrist of the operator, the scarifying teeth are lifted clear of the product on the reverse stroke when the scraper edge of the bowl is effective to collect the scarified material.

Having thus described the invention, what is claimed as new and patentable is:

1. A device of the character described including an axially elongated handle, an elongated concave oval bowl-shaped scraper mounted at one end of the handle, the relatively opposite ends of the scraper bowl being closed by the concavity of the bowl wall, said scraper having an elliptical opening facing the handle in a plane perpendicular to the axis of the handle, the major axis of the elliptical opening being transversely perpendicular to the handle axis whereby one of the elongated arcuate edges of the elliptical opening is spaced on each side of the handle axis, the arcuate edges of the elliptical opening being sharp, whereby the bowl is adapted for scraping and collecting the materials by manipulating the utensil in scraping strokes along the surface of the material to be scraped.

2. A utensil of the character described having an axially elongated handle, an elongated oval concave bowl-shaped scraper mounted at one end of the handle and spaced therefrom, said scraper bowl having an elliptical opening facing the handle in a plane perpendicular to the axis of the handle, the relatively opposite ends of the scraper bowl being closed by the concavity of the bowl walls, the major axis of the bowl opening being transversely perpendicular to the axis of the handle, and the opposite elongated arcuate edges of the elliptical opening of the bowl being respectively on opposite sides of the handle axis.

3. A utensil of the character described having an axially elongated handle, an oval bowl-scraper member mounted at one end of the handle, the scraper bowl having an elliptical opening facing the handle, said opening being in a plane perpendicular to the axis of the handle, the major axis of the elliptical opening being transversely perpendicular to the handle axis, a bifurcated yoke connecting the scraper to the handle, the bifurcation of the yoke being spaced from the plane of the elliptical opening of the scraper and the arms of the yoke being respectively connected to the bowl at the opposite ends of the major axis of the elliptical opening, the relative opposite elongated arcuate edges of the elliptical opening being on opposite sides of the handle axis.

GAETANA TERNULLO.

REFERENCES CITED

The following references are of record in the file of this patent:

UNITED STATES PATENTS

| Number | Name | Date |
|---|---|---|
| 478,810 | Nittinger, Sr. | July 12, 1892 |
| 790,228 | Rohrer | May 16, 1905 |
| 881,329 | Nagasse | Mar. 10, 1908 |
| 1,987,091 | Kundebagian | Oct. 23, 1934 |